United States Patent [19]

Marmorat et al.

[11] 4,324,616
[45] Apr. 13, 1982

[54] DETACHABLE AND LEAKTIGHT DEVICE FOR CLOSING AN ORIFICE OF A NUCLEAR REACTOR VESSEL

[75] Inventors: Andre Marmorat; Rene Montaron, both of Le Creusot, France

[73] Assignee: Framatome, Courbevoie, France

[21] Appl. No.: 127,969

[22] Filed: Mar. 7, 1980

[30] Foreign Application Priority Data

Mar. 7, 1979 [FR] France ............................. 78 05856

[51] Int. Cl.³ .............................................. G21C 19/20
[52] U.S. Cl. .................................. 376/203; 414/146; 376/205; 376/245
[58] Field of Search ...................... 176/19 R, 30, 87; 414/146

[56] References Cited

U.S. PATENT DOCUMENTS

| 3,653,410 | 4/1972 | West | 176/30 |
| 3,853,702 | 12/1974 | Bevilaqua | 176/19 R |
| 4,028,176 | 6/1977 | Kraupa | 176/87 |
| 4,174,123 | 11/1979 | Schluderberg | 176/87 |

*Primary Examiner*—Donald P. Walsh
*Attorney, Agent, or Firm*—Haseltine and Lake

[57] ABSTRACT

A detachable and leaktight device for closing an orifice of a nuclear reactor vessel during hydraulic pressure testing comprises a body which bears, inside the vessel, on an internal part of the vessel which is resistant to the thrust stresses during the application of pressure, sealing means for producing a seal between the interior and the exterior of the vessel and being mounted on the body, and operating means for fixing and/or demounting the device, the operating means being accessible and operable from outside the vessel.

5 Claims, 4 Drawing Figures

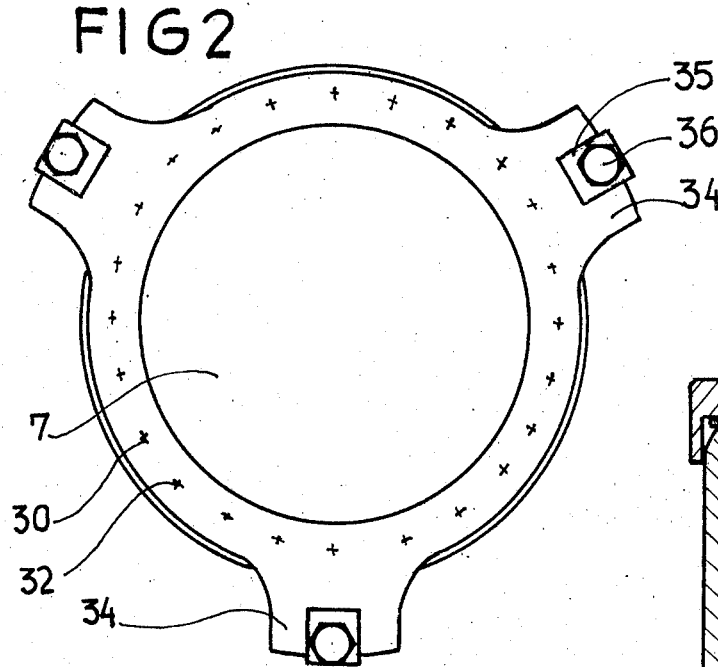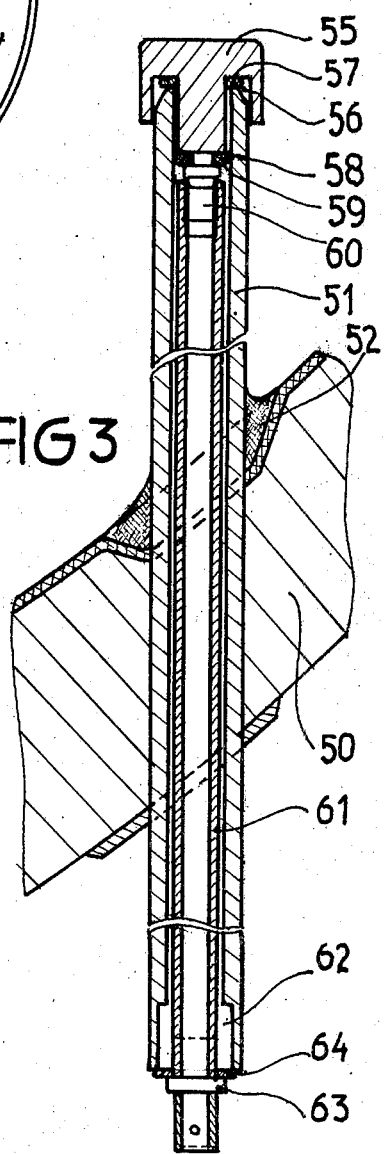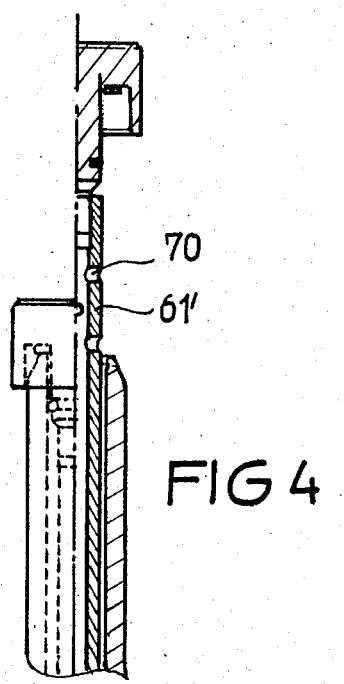

DETACHABLE AND LEAKTIGHT DEVICE FOR CLOSING AN ORIFICE OF A NUCLEAR REACTOR VESSEL

The invention relates to a detachable and leaktight device for closing an orifice of a water-cooled nuclear reactor vessel, during hydraulic pressure testing, before the vessel, which is entirely constructed in the workshop, is transported to the nuclear reactor site and connected to the pipes for cooling fluid and instrumentation.

The vessel has orifices for connection to the inlet and outlet pipes for the primary fluid, to the instrumentation tubes passing through the bottom of the vessel, and to the adaptors for the mechanisms for operating the control rods.

In order to carry out hydraulic testing, that is to say in order to apply, to the inside of the vessel, high pressures such as will in use be exerted by pressurized water filling the vessel, it is necessary to close these orifices with devices which can withstand very high pressures.

In fact, in the case of a water-cooled nuclear reactor, it is necessary to apply a pressure programme, generally laid down in the specification, to check the resistance of the body of the vessel, of the cover and of the bolts for bolting the cover to the vessel, to pressures which are similar to or greater than the operating pressure of the reactor.

In order to monitor the behaviour of the various components of the vessel during hydraulic testing, it is necessary to arrange measuring and monitoring devices, such as stress gauges, inside the vessel and to bring instrumentation leads outside the vessel in order to record the result of the measurements. It is therefore necessary to provide leaktight passages for bringing these instrumentation leads out.

It is also necessary to provide leaktight passages for supplying the vessel with the pressurised water required for hydraulic testing.

Hitherto, the orifices of the vessel were closed, before hydraulic testing, using curved covers which were welded to the pipes or nozzles on these orifices.

The leaktight passages for the instrumentation were also arranged in these curved covers, and leaktight passages on the adaptors for mechanisms made it possible to feed the vessel with water.

The use of these curved covers welded to the pipes or nozzles on the vessel has certain disadvantages because it is necessary to provide on the ends of the pipes an extra thickness of metal to which the curved cover is to be welded, these covers being cut, after hydraulic testing, in order to detach them from the ends of the tubes.

Before delivering the vessel to its final location, it is then necessary to re-machine the ends of each pipe provided with the extra thickness of metal to which the curved cover was welded, in order to make it possible to connect the pipe to for example the pipe for cooling fluid.

All these successive operations of course have disadvantages as regards both the cost and time involved in the operations.

It is an object of the invention to provide a detachable and leaktight device for closing an orifice of a nuclear reactor vessel, during hydraulic pressure testing, before connecting a pipe for fluid or instrumentation thereto, the device making it possible to avoid welding and machining operations on the vessel before and after the hydraulic testing of the vessel in the workshop.

For this purpose, the device according to the invention comprises a body adapted to bear, inside the vessel, on an internal part of the vessel which is resistant to the thrust stresses during the application of pressure, sealing means producing a seal between the interior and the exterior of the vessel, said sealing means being mounted on said body, and operating means for fixing or (on the contrary) removing said device operable from outside the vessel.

In order to provide a clearer understanding of the invention, two embodiments of a device according to the invention will be described, by way of example only, with reference to the accompanying drawings.

In the drawings:

FIG. 2 is a view in the direction of the arrow A of FIG. 1;

Figure 1:
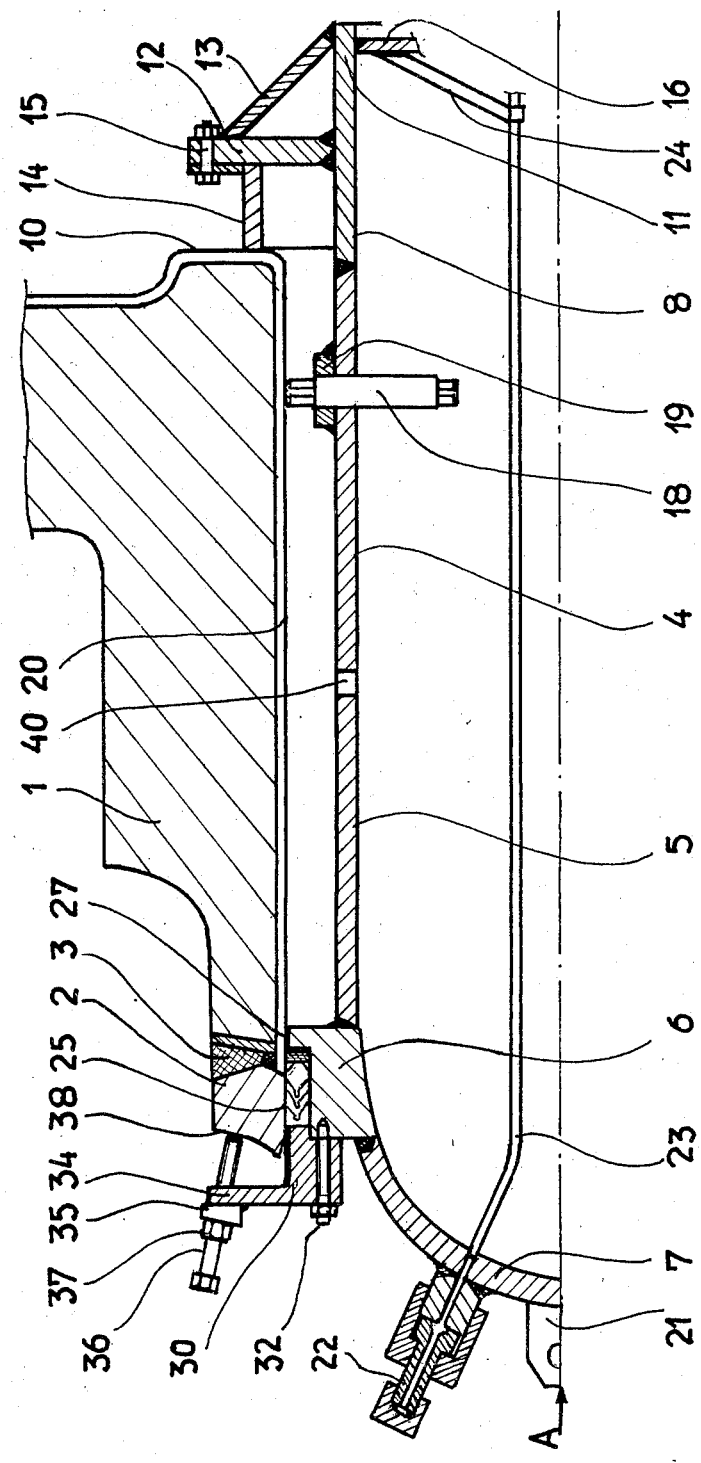
FIG. 1 is a half-section, through a vertical plane of symmetry, of an embodiment of a closing device according to the invention, in position inside an outlet pipe of a pressurized water nuclear reactor vessel, the pipe being intended for connection to the primary circuit of the reactor.

FIG. 3 is a view in section through a vertical plane of an embodiment of a closing device according to the invention, for closing a tube for the passage of instrumentation through the bottom of a pressurized water nuclear reactor vessel; and FIG. 4 is a view in section through a vertical plane of a modified embodiment similar to that of FIG. 3 but in which the upper part of the device is modified for use where the device also enables discharge of the water filling the reactor vessel during hydraulic testing.

FIG. 1 shows the outlet pipe 1 of the vessel of a pressurised water nuclear reactor. A ring 2 is provided at the end of the pipe 1 to enable welding of the pipe to the primary outlet piping, when the vessel is positioned on site.

This connecting ring 2 is joined to the body of the pipe 1 by a welding zone 3, the resistance of which must be tested when the hydraulic test is carried out.

For the hydraulic test a closing device is positioned inside the pipe and at the level of the connecting ring 2.

The closing device comprises a body 4 comprising a central shell 5, at the front end of which a gasket-carrying ring 6 is fixed, the ring itself being joined to a curved cover 7.

At the rear end of the body 4, a bearing collar 8 is welded which enables the closing device to bear on the internal wall 10 of the vessel at the level of the pipe. The bearing collar 8 forming the rear part of the closing device comprises a shell 11, welded to the shell 5, a cheek or flange 12 welded to the shell 11 and held in place by a support structure 13, and a bearing ring 14 detachably fixed to the cheek 12 by means of screws 15.

The cylindrical shell 11 is also welded to a strengthening ring 16 for stiffening the structure of the closing device or plug and providing a support for instrumentation.

The device also carries centering screws, such as 18, at the level of the median shell 5, three centering screws 18 being provided angularly spaced apart by 120° over the periphery of the shell and bearing on the internal surface 20 of the pipe 1. As will become apparent, these three screws 18 make it possible to centre the device inside the pipe when it is placed in position.

The curved cover 7, constituting that part of the device which is to be located at the level of the outer face end of the pipe, carries a lifting ring 21 and is provided with a leaktight passage 22 for instrumentation, which passage 22 is extended by a tube 23 held in place inside the device by support 24 made fast or integral with the strengthening ring 16.

The tube 23 and the leaktight passage 22 make it possible to bring out leads connected to instrumentation inside the vessel during the hydraulic pressure tests, such instrumentation comprising, for example, stress gauges for measuring the stresses and deformations undergone by the various parts of the vessel during hydraulic testing.

The gasket-carrying ring 6 has a housing in its radially outer or external part, inside which sealing means comprising a set of deformable gaskets 25 are placed, the gaskets 25 being arranged, when the device is in position inside the pipe 1, at the level of the external welding ring 2 on the pipe.

The inner part of the gasket-carrying ring 6, that is to say the part of the ring 6 located near the interior of the vessel, provides, between the internal surface of the pipe and its own external surface, a small space 27 which allows pressurized fluid to pass as far as the sealing means zone, the latter itself being arranged outwardly of the welding zone 3 of the welding ring on the outer part of the pipe. In this way, it is possible to test the welding zone 3 under pressure when hydraulic testing is carried out.

When the device is in position, as shown in FIGS. 1 and 2, the outer part of the gasket-carrying ring 6 is connected by a set of bolts 32 to a clamping flange 30 which comprises an annular part and three clamping lugs 34, as shown in FIG. 2. Clamping wedges 35 are arranged in contact with the clamping lugs and are tapped so that a screw 36, provided with a nut 37 for locking it, engages with the tapping in the wedge 35 and contacts the external face 38 of the pipe 1, to exert a pull on the device so as to apply the bearing ring 14 against the internal surface of the vessel 10.

The clamping and then the locking of the three screws 36 arranged at the periphery of the clamping flange 30 therefore makes it possible to hold the device in place inside the pipe, the screws being actuated from outside the vessel.

When the device is positioned in the vessel before the hydraulic test, the sealing means are not compressed. A seal is not produced until the pressurised water is introduced into the vessel and fills the space between the device and the internal surface of the pipe, and then, by virtue of the small space 27, fills the zone of the space in which the sealing means are located, the sealing means thus being compressed by the fluid against the clamping flange 30 with the result that the gaskets of the sealing means expand radially and close the housing in the ring 6 in a leaktight manner.

The device is provided with openings 40 in the shell 5 through which pressurised water is introduced into the space between the pipe and the device in order to permit equalisation of the pressure. These holes 40 are also used to purge and empty the space between the device and the wall of the pipe.

An operation for positioning a device for closing a primary water outlet pipe, such as the pipe shown in FIG. 1, before hydraulic testing, will now be described.

The vessel is installed on turning gear in the horizontal position and the pipe which is to be provided with a closing device is positioned with its axis vertical by means of the turning gear, its outer end pointing upwards.

The device is provided with a suitable bearing ring 14 which is designed for the type of vessel orifice and the vessel concerned, and is arranged on a carriage resting on rails located along generatrices of the vessel in the horizontal position.

The rails are themselves mounted on sets of wheels in contact with the interior lining of the vessel, the sets of wheels making it possible to orientate the roller track comprising the rails on which the plug-carrying carriage rests, so that the rolling plane remains horizontal when the vessel is orientated, by means of the turning gear, by rotation about its horizontal axis.

The roller track is extended inside the vessel to a sufficient extent to bring the carriage, together with the closing plug, in vertical alignment with the pipe.

A working platform, enabling access to the upper part of the vessel in the horizontal position, is then placed near the pipe, outside the vessel.

In contrast to the device shown in FIG. 1, the device arranged on the carriage and brought into vertical alignment with the pipe does not comprise the clamping flange 30 or the gasket 25, the latter components being fitted to the device at a later stage.

The device is positioned using two manually operated pullies fixed to an overhead trolley hook arranged vertically above the pipe of the vessel.

In the case of the nuclear reactor vessels currently constructed, it is necessary to use a blocking plug having a weight of approximately two tonnes; a pulley having a lifting capacity of three tonnes will therefore be used for handling this device inside the vessel.

The pulley having a lifting capacity of three tonnes is connected to the lifting ring 21 on the device, and, using this pulley, the device is raised until it comes into contact with the pipe, that is to say until the bearing ring 14 comes into contact with the internal surface 10 of the vessel at the level of the pipe. The device is held in place by virtue of the lifting means, and is centered inside the pipe by means of the three screws 18 operated from inside the vessel. For these operations of centering the device by means of the screws 18, an operator must be underneath the device and, for safety reasons, it is then desirable temporarily to mount auxiliary lugs on the ring 6 of the device in order to prevent a fall during the adjustment operations.

By virtue of the second pulley, which can be, for example, a pulley having a lifting capacity of 250 kg, the gaskets are positioned inside the housing in the gasket-carrying ring 6, and the clamping flange 30 is positioned on the gasket-carrying ring 6 with the holes for the bolts 32 on the clamping flange and on the gasket-carrying ring in alignment.

The flange and ring are then fixed together using the bolts 32.

The clamping and the final fixing of the device in the pipe are carried out using the screws 36 which exert a pull on the clamping flange 30 and on the components connected thereto by means of the bolts 32.

When this clamping has been carried out, the bearing ring 14 and the ends of the screws 36 effect the fixing of the device inside the pipe. The pulleys used to position the device and the clamping flange, and the working platform, can then be removed in order to rotate the vessel to a new position in which another pipe can be provided with a device.

During these operations, care must be taken to successively equip opposite pipes on the vessel in order to prevent the latter from becoming unbalanced.

When all the pipes have been equipped and all the other orifices in the vessel have been closed, pressurised water can be introduced into the vessel in order to carry out the hydraulic testing.

The water penetrating into the space between the device and the pipe, and then, by means of the passage 27, into the space in the gasket-carrying ring where the gaskets 25 are located, causes these gaskets to expand radially, which ensures a seal, whereas, during positioning, the gaskets were not expanded and did not ensure a seal.

When the required hydraulic pressure has been established inside the vessel, the stresses exerted on the device are entirely withstood by the bearing ring 14 which is in contact with the internal surface of the vessel at the level of the pipe.

In this way, no metal component of low resistance is involved in holding the device inside the pipe during hydraulic testing.

It should be noted that hydraulic testing is carried out after this vessel has been transported to the test stand and placed in the vertical position. During this transportation and the vertical positioning, the entire closing device is fixed to the vessel and held firmly in place by virtue of the clamping means comprising the flange 30 and the screws 36.

In order to remove the closing devices, after hydraulic testing, the vessel is placed back on the turning gear and the devices are removed successively from each pipe after they have been connected to the lifting pulley located vertically above the pipe.

This removal is carried out by loosening the screws 36 and then by releasing the flange 30 from the gasket-carrying ring 6 by unscrewing the bolts 32.

In the operation described, the devices are mounted in the pipes with the vessel in the horizontal position on turning gear, but it is also possible to position the devices when the vessel is in the vertical position, for example on the test stand.

In this case, the device is positioned using C-shaped gear, supported by a pulley, which holds the device in the horizontal position. With the horizontally positioned device located in alignment with, and opposite, the pipe which is to be equipped, traction gear, operated from the platform, brings the device into a position in contact with the pipe, the rear bearing ring bearing against the internal surface of the vessel.

FIGS. 3 and 4 show a closing device for closing an instrumentation tube passing through the bottom of the vessel.

FIG. 3 shows the bottom of the vessel 50, through which an instrumentation tube 51 passes, the instrumentation tube being welded to the bottom of the vessel at the level of a hollow 52 which is filled with welding metal to insure a leaktight join between the tube and the bottom of the vessel.

The closing device comprises a body in the form of a cap 55, which is provided with a gasket housing 56 in an internal part, a gasket 57 being arranged inside the housing 56. The gasket 57 is thus intercalated between the body of the sealing device 55 and the end of the instrumentation tube 51 when the device is in position.

The inner part of the body 55 of the closing device is provided with a housing 58 for a gasket 59 for providing a temporary seal for the device during mounting and demounting of the closing device. This inner part of the cap 55, which penetrates inside the instrumentation tube when the closing device is in position, also comprises a threaded part 60 which is engageable with a corresponding tapped part of a tubular operating rod 61 which is engaged in the instrumentation tube, and the outer part 62 of which is engageable with a nut 63 for tightening the cap 55 against the instrumentation tube 51, with the interposition of the gasket 57, via a ring 64 arranged between the nut 63 and the outer end of the instrumentation tube.

To position the device for closing the instrumentation tube, it suffices to present the cap 55, made fast with the operating rod 61, at the inner end of the instrumentation tube 51, the vessel being either horizontal or vertical. The rod 61 is then inserted in the bore of the instrumentation tube 51. The gaskets 57 and 59 are placed in position when the cap/rod assembly is introduced into the instrumentation tube. It then suffices to engage the nut 63 on the outer end of the rod 61 and to tighten the nut 63 in order to produce a join, between the instrumentation tube and the closing device, which is sufficiently strong for all the operations for displacement or transportation of the vessel until it reaches the test stand.

When pressurised water is introduced into the vessel to carry out the hydraulic test, the thrust forces due to the high pressure of the water are exerted on the cap 55 and, via the gasket 57, on the instrumentation tube 51. These forces thus tend to improve the seal between the cap 55 and the instrumentation tube and, furthermore, they are exerted on a part which is resistant in the axial direction, that is to say the instrumentation tube welded to the bottom of the vessel.

At the end of the hydraulic pressure test, it suffices to unscrew the nut 63 in order to release the operating rod 61. It is then possible to raise the closing cap 55 and to free the mouth of the tube for the passage of instrumentation.

FIG. 4 shows, in the raised position, that is to say in the open position, a device which is similar to that shown in FIG. 3 but in which the rod 61' is provided with openings 70 in its lateral surface. The function of these openings 70 is to allow water present in the vessel during the hydraulic tests to flow out, after the closing device has been raised as shown in FIG. 4.

In order to be able to free all the openings 70 which are provided over a certain length of the operating rod, it is obviously necessary to provide, at the base of the device, a sufficient length for vertical displacement of the rod 61'.

A number of the closing devices will be provided in this manner so as to enable the vessel to be emptied and in a rapid and simple manner.

It will be understood that the main advantages of the above described embodiments of device according to the invention, whether applied to the case of pipes for connection to the primary circuit or to the case of instrumentation tubes passing through the bottom of the vessel, are that these devices are entirely detachable and extremely leaktight and that their pressure resistance is achieved simply by the bearing of the body of the device on a resistant part of the internal wall of the vessel or on a member rigidly fixed to the internal wall of this vessel.

Furthermore, the devices are extremely easy to demount or remove because the operating members which permit this removal are located entirely on the outside of the vessel and are readily accessible therefrom.

The seal is also ensured by means of sealing means on which the hydraulic testing pressure is exerted, and this tends to improve the seal when the testing pressure increases.

Finally, it will be clear that, by using a device according to the invention, all the welding and machining operations on the devices of the prior art are avoided, and that the time and the costs involved in carrying out the hydraulic pressure tests are reduced.

However, the invention is not intended to be restricted to the embodiments which have been described in connection with the closing of the pipes for connection to the primary circuit and the instrumentation tubes passing through the bottom of the vessel; on the contrary, it includes all the variants thereof, and points of detail can be modified without thereby going outside the scope of the invention.

Thus, the closing device can be positioned in a different way from that which has been described, either with the vessel in the horizontal position or with the vessel in the vertical position.

Likewise, the fixing of this closing device, before placing the vessel under pressure, can be carried out by means of various screw and nut devices, as has been described in the illustrative embodiment.

Furthermore, closing devices according to the invention can be used not only for closing pipes of the primary circuit or tubes for the passage of the instrumentation through the bottom of the vessel, but also for closing adaptor sleeves for the operating mechanisms passing through the cover of the vessel. Caps will be used to close these sleeves and, in the set of caps used for closing the sleeves, it is possible to provide a form of cap which makes it possible to fit a manometer, and another form of cap which makes it possible to introduce the pressurised water channel for carrying out the hydraulic tests.

Finally, the invention is applicable whenever it is desired to close the orifices made in a nuclear reactor vessel in order to carry out hydraulic pressure testing of the interior of the vessel, before bringing the vessel into service and connecting the pipes for cooling fluid and instrumentation to the corresponding orifices.

What is claimed is:

1. A removable and leaktight device for closing the orifice of a pipe connection in the vessel of a water cooled nuclear reactor during hydraulic pressure testing, and before connecting a pipe for primary fluid, said device comprising:

a body adapted to bear, inside the vessel, on an internal part of the vessel which is resistant to thrust stresses during application of pressure, being defined by at least one cylindrical shell having a diameter which is less than the internal diameter of the pipe connection, said cylindrical shell being joined, at the inner end thereof, which inner end is intended to enter the vessel, to a bearing member for bearing on the internal part of the vessel, and being fixed at the outer part thereof, to be located near the exterior of the vessel, with a ring and a curved cover closing said shell and producing an entirely closed structure relative to the exterior of the vessel, sealing means comprising a set of annular gaskets being carried by said ring and located, when said device is in position in the pipe connection, between an external surface of said ring and an internal surface of the outer end of the pipe connection, and operating means for fixing said device comprising a clamping flange, means for fixing said clamping flange to said ring, and clamping screws for bearing on the outer end of the pipe for exerting a tractive stress on said clamping flange and on the remainder of said device.

2. A device according to claim 1, comprising: a leaktight passage for instrumentation leads which extends through said curved cover.

3. A device according to claim 1, including: attachment means for use in handling said closing plug and fixed to said cover.

4. A device according to any one of claims 1 or 2 or 3, wherein: said bearing member is detachable from said body adaptation to vessels of different dimensions and different shapes.

5. A device according to claim 2, including: screws for centering said device in the orifice of the pipe, said screws being arranged radially on said shell.

* * * * *

UNITED STATES PATENT AND TRADEMARK OFFICE
CERTIFICATE OF CORRECTION

PATENT NO. : 4,324,616

DATED : April 13, 1982

INVENTOR(S) : Andre Marmorat et al.

It is certified that error appears in the above—identified patent and that said Letters Patent is hereby corrected as shown below:

On the title page, item (30) priority data

"78 05856" should read -- 79 05856 --.

*Signed and Sealed this*

*Twenty-second* Day of *June 1982*

[SEAL]

Attest:

GERALD J. MOSSINGHOFF

Attesting Officer  *Commissioner of Patents and Trademarks*